United States Patent
Benabid et al.

(10) Patent No.: US 8,306,379 B2
(45) Date of Patent: Nov. 6, 2012

(54) HOLLOW-CORE PHOTONIC CRYSTAL FIBRE

(75) Inventors: Abdel Fetah Benabid, Bath (GB); Francois Yves Michel Denis Couny, Bath (GB); Peter John Roberts, Birkrod (DK)

(73) Assignee: GLOphotonics SAS, Limoges (FR)

( * ) Notice: Subject to any disclaimer, the term of this patent is extended or adjusted under 35 U.S.C. 154(b) by 122 days.

(21) Appl. No.: 12/681,544

(22) PCT Filed: Sep. 24, 2008

(86) PCT No.: PCT/GB2008/003236
§ 371 (c)(1),
(2), (4) Date: Jun. 18, 2010

(87) PCT Pub. No.: WO2009/044100
PCT Pub. Date: Apr. 9, 2009

(65) Prior Publication Data
US 2010/0328658 A1    Dec. 30, 2010

(30) Foreign Application Priority Data
Oct. 3, 2007    (GB) .................... 0719376.6

(51) Int. Cl.
*G02B 6/032* (2006.01)
(52) U.S. Cl. ........................... 385/125; 385/144
(58) Field of Classification Search .......... 385/125–127, 385/142, 144
See application file for complete search history.

(56) References Cited

U.S. PATENT DOCUMENTS

| | | | | |
|---|---|---|---|---|
| 6,778,749 | B2 * | 8/2004 | Allan et al. | 385/125 |
| 6,985,661 | B1 * | 1/2006 | Russell et al. | 385/125 |
| 7,295,740 | B2 * | 11/2007 | Sanghera et al. | 385/125 |
| 7,343,074 | B1 * | 3/2008 | Gallagher et al. | 385/125 |
| 7,346,249 | B2 * | 3/2008 | Russell et al. | 385/123 |
| 7,418,836 | B2 * | 9/2008 | Dong et al. | 65/393 |
| 7,532,798 | B2 * | 5/2009 | Williams et al. | 385/125 |
| 2005/0069269 | A1 * | 3/2005 | Libori et al. | 385/125 |
| 2007/0110377 | A1 | 5/2007 | Sanghera et al. | |

FOREIGN PATENT DOCUMENTS

| | | |
|---|---|---|
| WO | WO 02/12931 A2 | 2/2002 |
| WO | WO 03/004425 A1 | 1/2003 |
| WO | WO 2004/001461 A1 | 12/2003 |
| WO | WO 2006/077437 A1 | 7/2006 |

OTHER PUBLICATIONS

International Search Report and Written Opinion for International Application No. PCT/GB2008/003236, mailed on Dec. 22, 2008, European Patent Office.

Allan, D., et al., "Photonic Crystal Fibers: Effective-Index and Band-Gap Guidance," C.M. Soukoulis (ed.), *Photonic Crystals and Light Localization in the 21$^{th}$ Century*, pp. 305-320 (2001), Kluwer Academic Publishers, Dordrecht, The Netherlands.

* cited by examiner

*Primary Examiner* — Daniel Petkovsek
(74) *Attorney, Agent, or Firm* — Sterne, Kessler, Goldstein & Fox P.L.L.C.

(57) ABSTRACT

A hollow core photonic crystal fiber (HCPCF) having a wavelength of operation, the HCPCF comprising: a core region having a first refractive index; a cladding region surrounding the core region and comprising a plurality of microcapillaries arranged in a transverse structure having a pitch, the pitch of the structure being at least five times larger than the wavelength of operation, the cladding region having a second refractive index higher than the first refractive index.

12 Claims, 10 Drawing Sheets

| Defect | Pitch Λ μm | Core size min/max μm | Strut width μm | Air-filling filtration |
|---|---|---|---|---|
| 1 cell | 11.8 | 22.3/26.1 | 0.67 | 0.82 |
| 7 cell | 11.5 | 43.7/45.4 | 0.61 | 0.83 |
| 19 cell | 10.9 | 47.8/68.3 | 0.51 | 0.85 |

|  | A | B | C |
|---|---|---|---|
| Pressure kPa | 0 | 20 | 50 |
| Pitch μm | 11.18 | 12.12 | 12.69 |
| Strut Thickness nm | 390 | 360 | 290 |

HOLLOW-CORE PHOTONIC CRYSTAL FIBRE

BACKGROUND

1. Field

The present invention relates to a hollow-core photonic crystal fibre (HCPCF) with a large pitch. By "large pitch" it is meant that the photonic structure has a pitch of a size of the order of five times or more as large as the wavelength of light at which the HCPCF operates. The present invention also relates to a HCPCF with a transverse structure comprising relatively thin connecting microcapillary walls. The present invention further relates to methods of manufacturing an HCPCF.

2. Background Art

A currently known HCPCF has a hollow core surrounded by a cladding of silica microcapillaries and creates a photonic band gap (PBG), trapping in the core defect electromagnetic waves within a particular range of optical wavelengths. HCPCFs are theoretically designed around two balancing factors: the need for a large PBG at the wavelength of interest and the feasibility of manufacturing the fibre with the methods available. Out of all known cladding structures, the best tradeoff between these two factors is a triangular lattice HCPCF.

An example of such a triangular lattice HCPCF has a triangular arrangement of air holes in a silica background, an air-filling fraction exceeding 90% and a pitch ($\Lambda$), which is the distance between the centres of the air holes in the cladding structure, approximately twice as large as the wavelength of operation ($\lambda$). For example, for one such HCPCF a pitch of 3-4 µm is required for a maximum of ~300 nm wide band gap centred at an infra-red (IR) wavelength of 1550 nm.

The guidance properties of such HCPCFs have resulted in applications such as efficient Raman lasers, gas-laser fibre devices, high power soliton delivery and efficient electromagnetically induced transparency.

However the pitch required to achieve fibre guidance in the visible or ultra-violet (UV) region of the optical spectrum is 2 to 4 times smaller than that of a fibre guiding in the IR. This is because the PBG is located at a relatively low normalized frequency $k\Lambda \sim 12$, where k, the propagation constant, $=2\pi/\lambda$, with the pitch scaling linearly with the guided wavelength. In general the pitch must be less than 2 µm for any known fibre guiding in the visible or UV.

The fabrication of such HCPCFs poses several engineering challenges. Firstly, the air filling fraction of the cladding structure required to maximize the PBG's optical wavelength span needs to be >90%. This often involves etching of capillaries or the insertion of glass rods through the interstitial holes between the thin capillaries during stacking to create the required structure. Secondly, the core mode couples with interface modes located at the core surround, which affects the guidance dramatically. This means that the core shape, thickness and size need to be accurately designed and controlled during fabrication. Thirdly, the small pitch required is difficult to control accurately during the fibre drawing process.

Because of the manufacturing techniques used (conventionally, capillaries are blown and then etched with a gas such as gaseous hydrogen fluoride (HF)), these small pitch triangular lattice HCPCFs also suffer from the problem that their optical properties are not optimum, for example because undesired modes may be present. These issues inherent to fabricating visible and UV guiding HCPCFs and the overlapping of guided light with silica limit their loss (optical attenuation) to about 1 dB/m.

As well as the fabrication difficulties, there are also other drawbacks that prevent such triangular lattice fibres from being used in applications requiring broadband guidance or guidance in the visible or UV. These include the intrinsically narrow optical transmission bandwidth of the fibre, the overlap between the fundamental mode and interface modes and the high light-in-silica fraction.

BRIEF SUMMARY

The present invention is set out in the claims.

According to one aspect, a HCPCF with a pitch five or more times larger than the wavelength of operation (a 'large' pitch) is provided. Such an HCPCF has various surprising optical properties. The mechanism by which the fibre guides removes some of the limitations present with currently known HCPCFs. The fibre possesses transmission regions at high normalized frequency ($\sim 20 < k\Lambda < 400$). The fibre exhibits a broad transmission region, which may be, for example, twenty times larger than that of the known triangular HCPCF discussed above, with relatively low loss. The fibre is relatively easy to fabricate and shows low surface mode coupling, a high light-in-core fraction and low chromatic dispersion.

According to another aspect, a HCPCF with a transverse structure comprising relatively thin (<5% and preferably <3% of the pitch $\Lambda$) portions of cane cladding walls connecting nodes is provided, so that the physical size of the low refractive index cladding structure constituent (e.g. air) approaches that of the pitch whilst the physical thickness of the high index cladding structure constituent (e.g. silica) is only 3% or less of the pitch. Such a HCPCF has improved optical properties because minimising the thickness of the connecting walls means that fewer cladding modes are present for the fibre and the nature of the supported modes means that they interact little with those of the core.

The optical properties of such fibres are explained by the fact that such a fibre, contrary for example to the known triangular HCPCF, does not guide by PBG, but by a mechanism whereby the coupling between the cladding modes and the core modes is extremely weak. Therefore the relevant photonic structures are not those having bandgaps but those that support photonic modes which exhibit a high degree of transverse optical field mismatch between the core and cladding modes.

According to a further aspect, in manufacturing a HCPCF controlled pressurisation during manufacture means wall thickness can be controlled during manufacture to give a desired wall thickness.

Further, in addition or alternatively, etching of canes forming the cladding with liquid HF based etchant also enables control of wall thickness meaning the thickness of the wall obtained can be controlled and a desired wall thickness can be obtained and The above-described HCPCF structure having relatively thin connecting walls is obtainable using this manufacturing method.

BRIEF DESCRIPTION OF THE DRAWINGS/FIGURES

Examples of the present invention will now be described with reference to the following drawings, in which.

DETAILED DESCRIPTION

In overview, a first disclosed fibre is a HCPCF with a transverse structure with a pitch at least five times larger than the wavelength of operation. HCPCF may also be known as band-gap fibre, air-guiding band-gap fibre, or microstructure fibre. The term HCPCF as used herein is understood to cover all such alternative terminologies, which will be familiar to the skilled reader. The HCPCF has a hollow core 1 (see also FIG. 3) surrounded by a cladding 2 of silica microcapillaries 3. By 'transverse' it is meant the direction perpendicular to the waveguide direction. The waveguide direction is the direction of the length of the holes 6 in the capillaries 3. As shown in FIG. 1, the pitch of a fibre is the distance 5 between centres of the holes 6 in the capillaries 3.

Figure 1A:
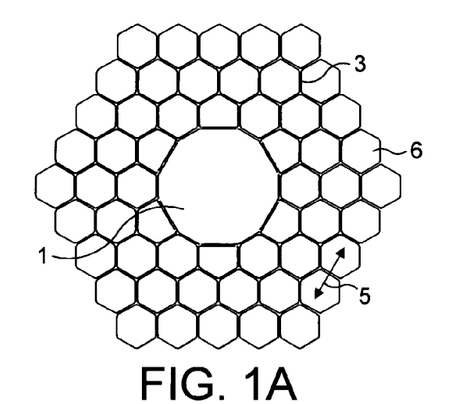
FIGS. 1A to 1E are diagrams of example HCPCFs with honeycomb, kagome (Star of David), square and two types of concentric ring arrangements of capillaries respectively.
Figure 1B:
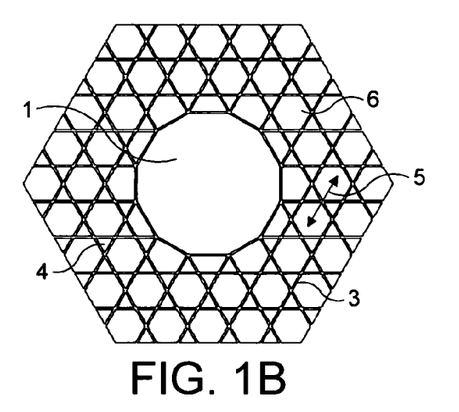
Figure 1C:
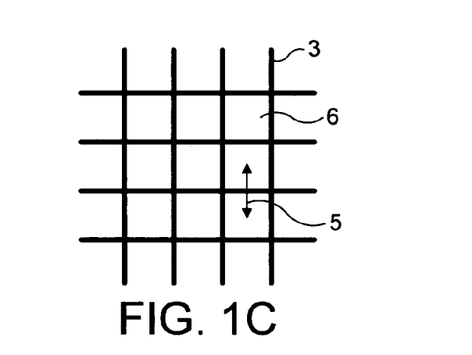
Figure 1D:
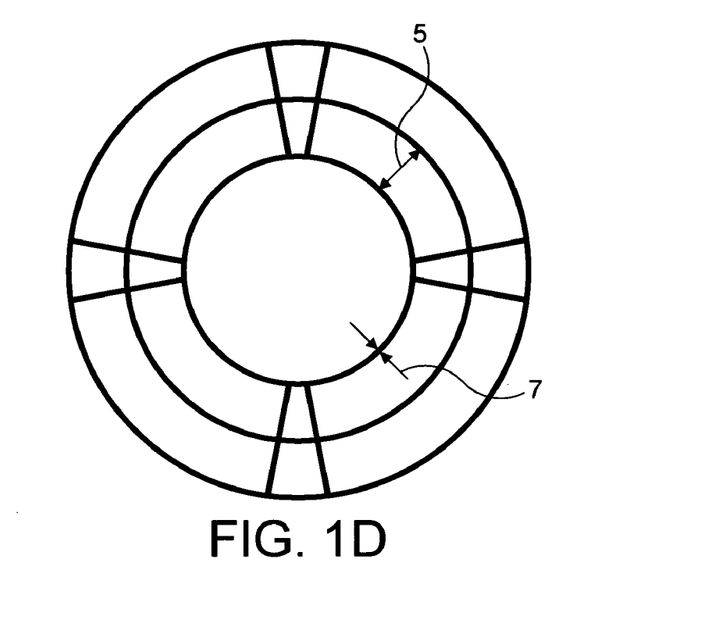
Figure 1E:
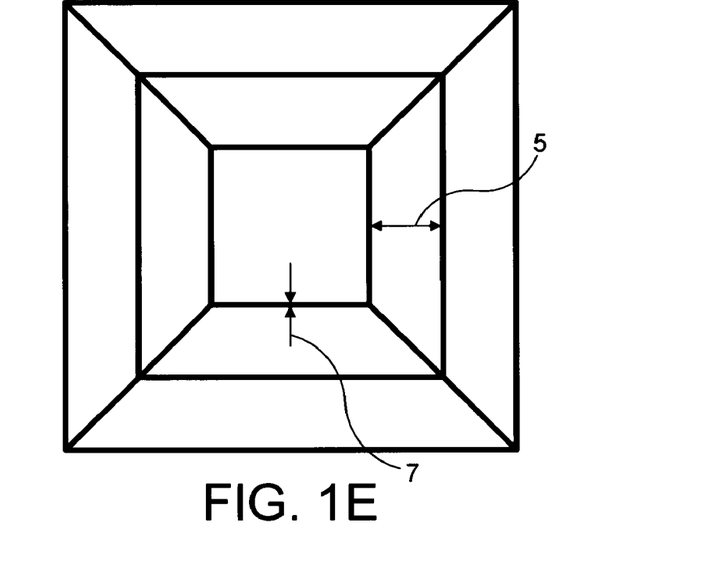
Figure 2A:
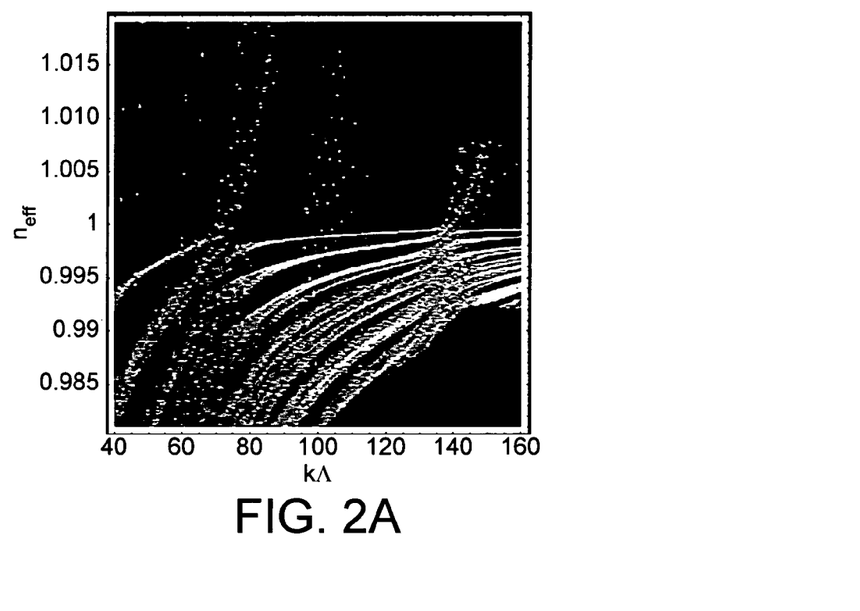
FIGS. 2A to 2D are plots of density of photonic states, that is of effective refractive index against normalised frequency, for honeycomb, kagome, square and concentric ring structures respectively.
Figure 2B:
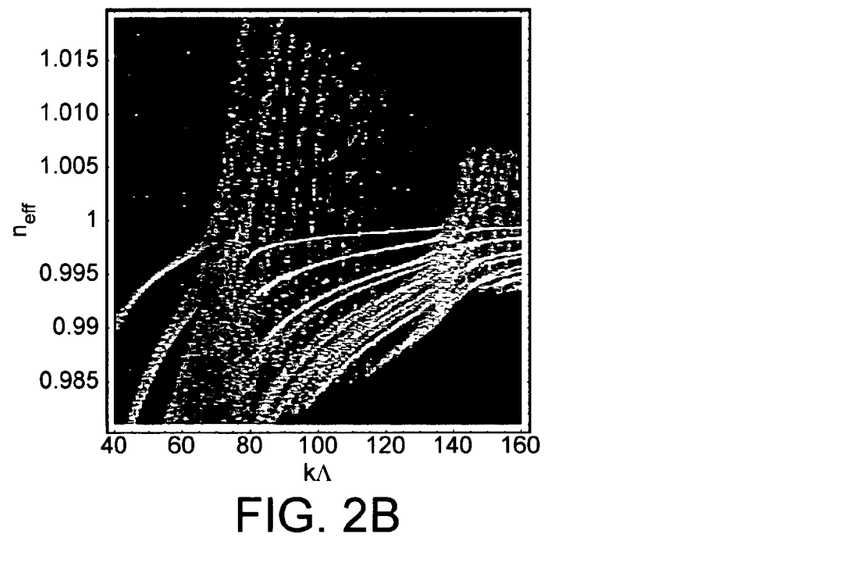
Figure 2C:
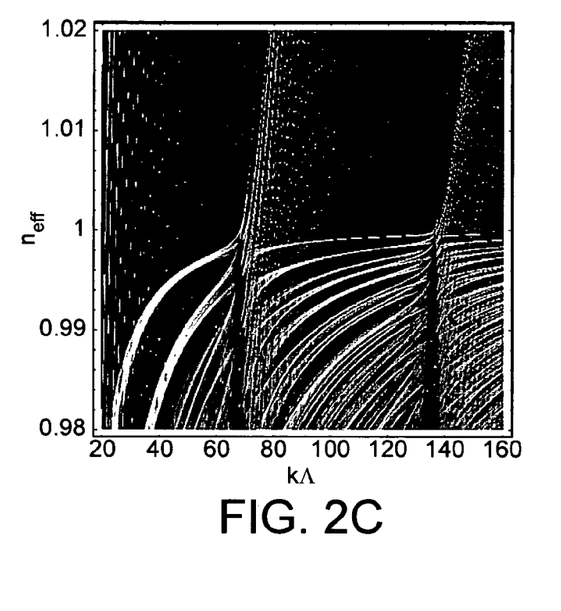
Figure 2D:
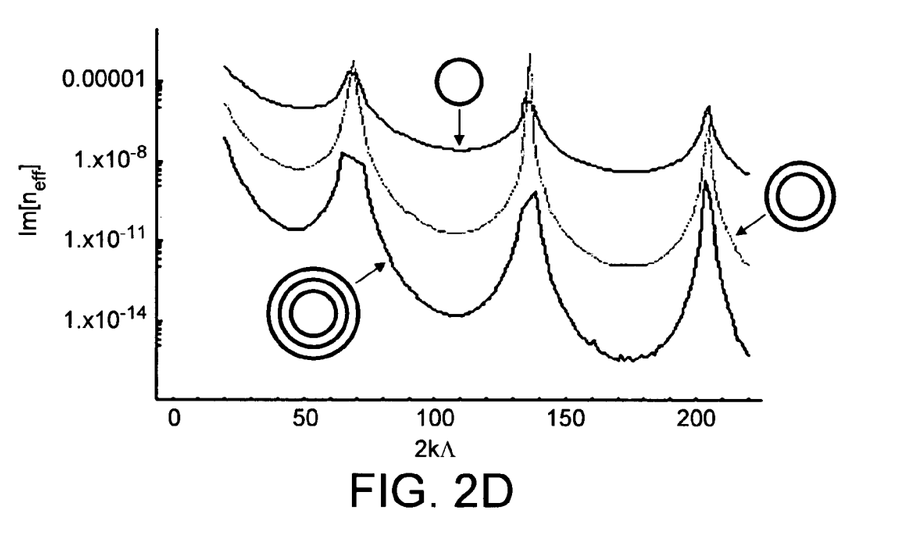

The example cladding structure shown in FIG. 1B is a kagome structure with a Star of David arrangement, where in the main body of the cladding 2, the microcapillaries 3 have an approximately hexagonal perimeter, and approximately triangular spaces 4 are present between them. The pitch of this example fibre is between 10 μm and 14 μm.

The transmission bands of such an example kagome fibre may occur at ranges of normalised frequency, kΛ, of 20 to 400. Therefore having a pitch of at least 10 μm enables wavelengths in ranges of ~100 nm-3000 nm to be transmitted. The upper limit of the kΛ is set for a particular structure by the phase matching between the core guide mode and those of the cladding holes. Guidance may still occur for a kagome lattice at kΛ higher than 400 but with higher loss. FIGS. 2A to 2D showing densities of photonic states of the honeycomb, kagome, square and concentric ring lattices respectively show operating normalised frequencies kΛ lying between 30 to 200 corresponding to a minimum pitch which is approximately five times larger than the operating wavelength. For the concentric rings shown in FIGS. 2C and 2D, the wall thickness 7 may be, for example, less than 0.05 of the size of the pitch 6 and the pitch 6 may be, for example, 6 μm or more.

Some more specific examples of kagome structure HCPCFs with different core sizes are described below, with reference to FIGS. 3 to 6. The bigger the core, the larger the number of core-modes present.

Figure 3:
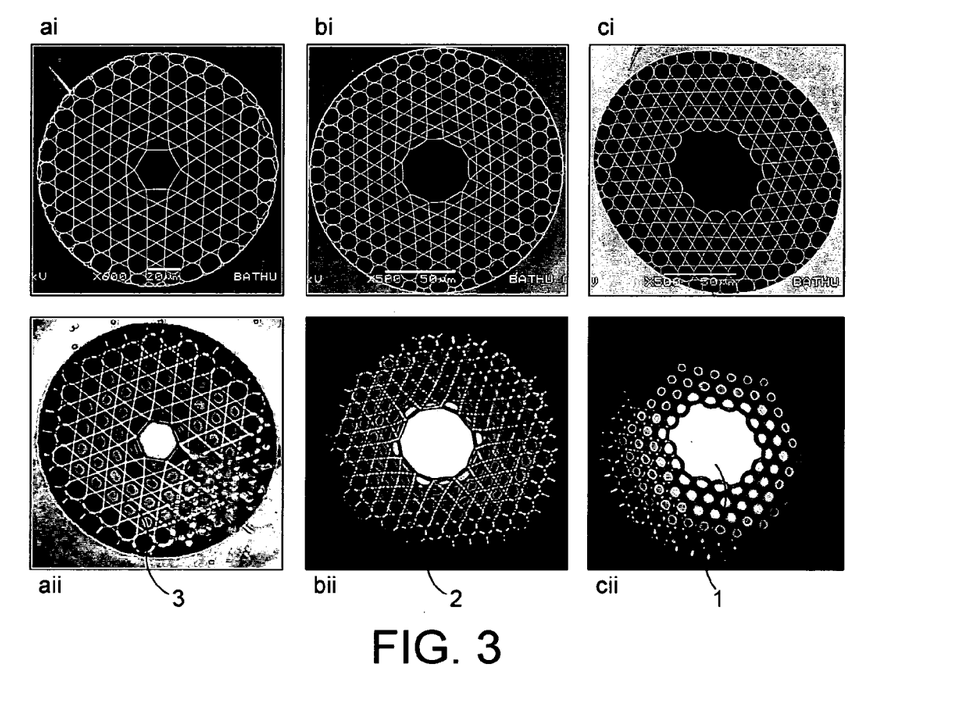
FIG. 3 shows scanning electron microscope (SEM) and optical micrograph images of three example kagome structure HCPCFs fabricated with a single cell, 7 cell and 19 cell core defect respectively from left to right of the figure.
Figure 4:
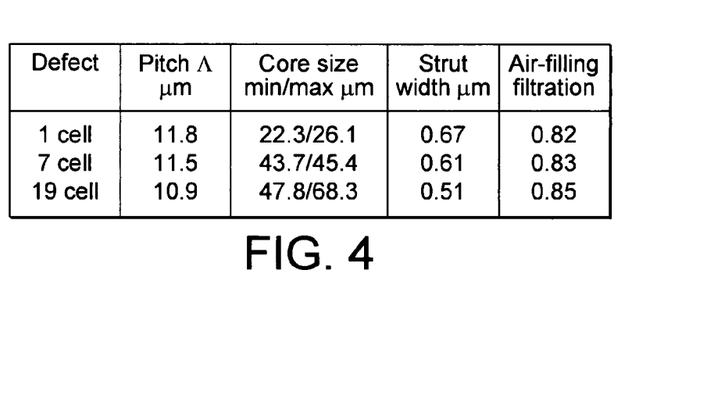
FIG. 4 is a table of physical dimensions for the example kagome HCPFs shown in FIG. 3.

FIG. 3 shows scanning electron microscope (SEM) (top row of images in the figure) and optical micrograph (bottom row of images in the figure) images of three example kagome structure HCPCFs, each with an outer diameter of 300 μm. FIG. 4 summarizes the fibres' dimensions. FIG. 3a shows a fibre where a single cell creates the core 1 defect, that is, one microcapillary is omitted from the structure. FIG. 3b shows a 7 cells defect core fibre and FIG. 3c a 19 cells defect core fibre. In these examples the single cell defect fibre core, which is the smallest core, is around 22 μm in diameter. This is comparable in size to a 19 cell defect triangular lattice HCPCF core. The 19 cell defect fibre core dimensions may reach a diameter of approximately 65 μm. The small differences in pitch and strut thickness between the samples lead to different colors being guided through the cladding.

Figure 5A:
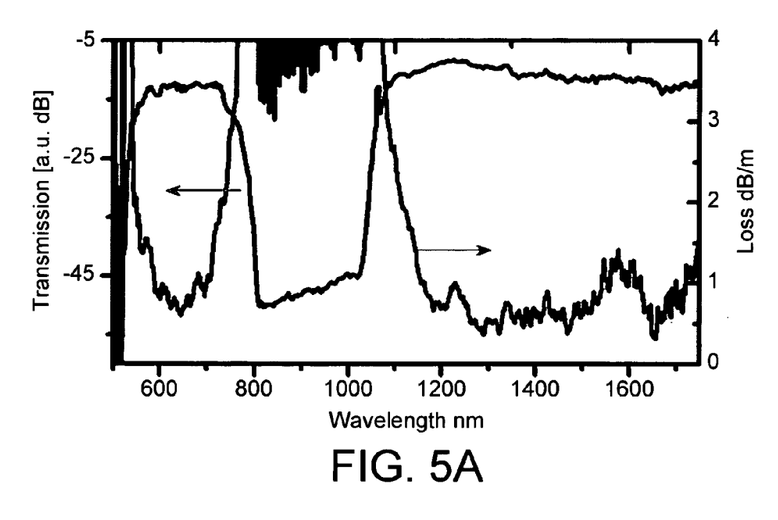
FIG. 5a shows a transmission and attenuation spectrum for a 19 cell defect fibre.

FIG. 5a shows the transmission spectrum for the example 19 cell fibre sample with two high transmission regions: one in the visible range spanning over 250 nm and the other one in the IR, as large as 700 nm. Low levels of core guidance may also be present in the low transmission region (800 nm-1025 nm). FIG. 5a also presents the cut-back loss measurement for the 19 cell defect fibre with a flat attenuation of 0.75 dB/m on average for the near IR band and reaching a minimum of 0.3 dB/m. The loss is also below 2 dB/m for most of the visible band, which is comparatively close to that of the triangular lattice HCPCF guiding in this region of the optical spectrum.

Figure 5B:
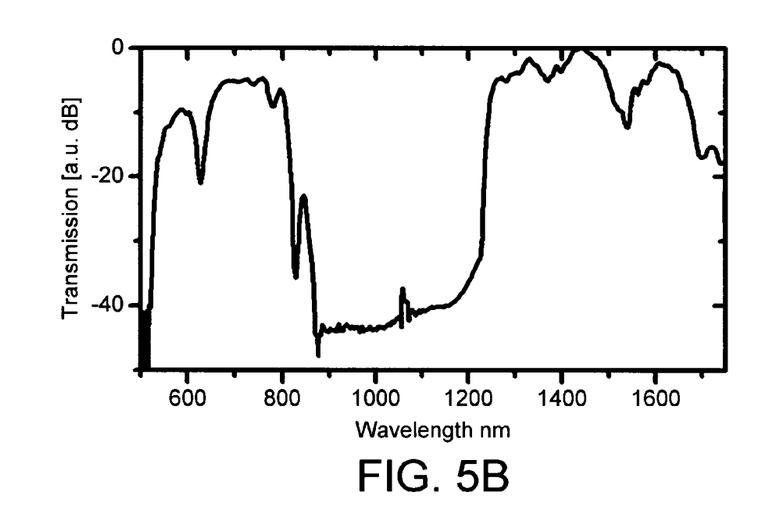
FIG. 5b shows a transmission spectrum for a single cell defect fibre.

FIG. 5b shows the transmission spectrum of the example single cell fibre. Although it is not as flat as for the 19 cell fibre, it still has two distinct regions of high transmission. It is noteworthy that the peaks like the one observed at 620 nm are not attributed to anti-crossings with interface modes. Indeed, the observation of the near field profile of the kagome fibre around these spectral regions shows no evidence of coupling into the silica surrounding or any other higher order modes around this spectral region, suggesting that the peaks are instead created by two closely spaced high transmission bands.

Figure 5C:
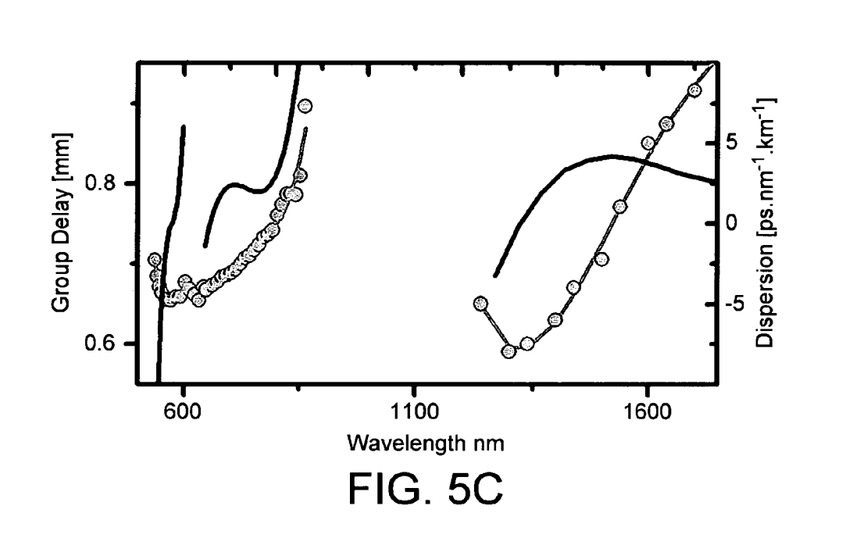
FIG. 5c shows a measured group delay and polynomial fit and the dispersion of a single cell defect fibre.

FIG. 5c presents the measured group delay and the dispersion of a 90 cm-long single cell fibre obtained by an interferometric method. The dispersion has the typical tilted, flattened S-shape of a photonic band gap fibre, though the average figure throughout the whole transmission region of 2 ps/nm/km is about 25 times lower than triangular lattice fibre's dispersion, except at the peaks identified above. The shape of both the transmission spectrum and the dispersion characteristics indicates the guidance is due to inhibited coupling between the core guided mode and the fast oscillating cladding modes. This is supported by the low sensitivity of the fibre transmission to bending, and the fact that the transmission bands can be red- or blue-shifted by increasing or decreasing the kagome lattice pitch.

Figure 6:
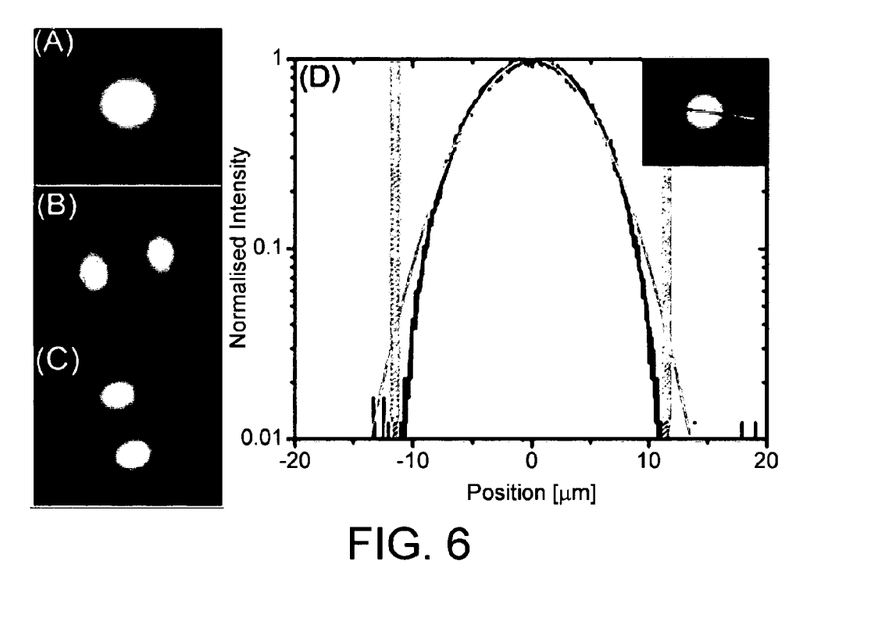
FIG. 6 shows (A, B and C) experimentally imaged near field profiles of selectively excited modes for a single cell defect fibre measured at 700 nm wavelength and (D) an intensity cross-section for the mode shown in A.

FIG. 6 shows the near-field pattern of 700 nm light transmitted through 1 m of a single cell defect fibre in operation. This fibre supports only a limited number of modes consisting of the fundamental mode (A) and two of the 4-fold degenerate higher order modes (B and C). Additionally, the excited fundamental mode is extremely well confined in the core as is shown in its radial profile in FIG. 5D. Most of the mode intensity is within the core boundary with no light detected in the silica surround or in the cladding holes, indicating an extinction ratio of >20 dB in the first ring of holes, much lower than that of triangular lattice HCPCFs. The mode profile is close to a Gaussian shape, indicating that the fundamental mode is predominant. The measured numerical aperture of this fundamental mode at 700 nm is 0.035.

The applicants have realized that the relatively small value of the thickness of the connecting strut forming the cladding structure with respect to the pitch creates a situation whereby the supported modes have very fast transverse oscillation on one hand and a steep dispersion curve (variation of effective refractive index index with normalised frequency) on the other hand, as shown in FIG. 2. These two features minimise the interaction with the core guided mode. Therefore an alternative or additional way of achieving the improved optical properties to having a 'large' pitch is having a 'small' connecting wall thickness.

Therefore, ideally, the structure of an HCPCF is defined just by 'nodes', as the vertices of the transverse cross-section of the cladding. The connecting walls of the canes 3 would ideally not be present at all, although they are needed for the practical purpose of defining the structure. The walls adversely affect the optical properties of the resultant HCPCF and it is desirable to make the capillary walls as thin as possible. This applies both to a fibre such as the first disclosed fibre with a pitch more than five times larger than the wavelength of operation but also applies to fibres with smaller relative pitch. Thinner capillary walls means fewer modes being present, and fewer of these modes being interacting. Also, the thinner the walls the broader the transmission bands. A second disclosed fibre therefore has a structure where, as shown in FIG. 1, the transverse cross section of the cladding 2 of the fibre, which is made from capillaries 3, has a pattern of nodes joined by struts/walls. The nodes may have a thickness in the range 200 nm-1 µm. The connecting portions may have a thickness of <3% of the pitch or more particularly, of <1% of the pitch.

One manner of fabrication providing such a structure is described below.

Figure 7:
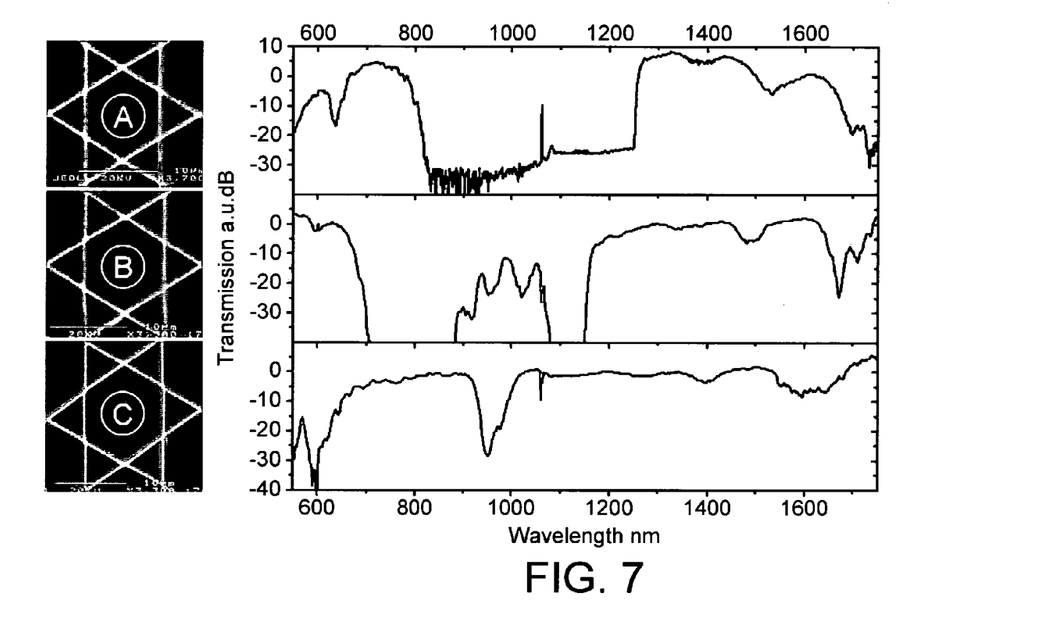
FIG. 7 shows scanning electron microscope images of the cladding of a kagome fibre fabricated a (A) 0 kPa, (B) 20 kPa and (C) 50 kPa gas pressure applied to both cladding and core and associated optical spectra.
Figure 8:
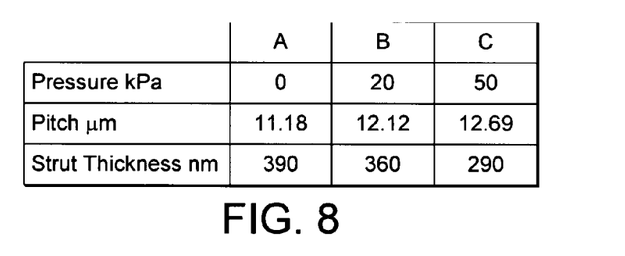
FIG. 8 is a table of the pitch and strut thickness for the example fibres shown in FIG. 8.

FIGS. 7 and 8 show characteristics of three kagome fibres fabricated with a view to optimizing the transmission bands. The required thinning of the cladding struts 8 is achieved by increasing the applied gas pressure within the cladding 2 and core 1 during the fibre drawing process, discussed further below. It can be seen that the thickness reduction obtained for fibres B and C compared to fibre A results in a dramatic enhancement of the transmission bandwidth accompanied by a shift of the bands to shorter wavelength. The expansion of the cladding region 2 also causes the pitch to slightly increase in size, but the spectral features do not shift to longer wavelength as might be conventionally be expected because the spectral positions of the low transmission bands are driven by resonances of the constituent glass struts which are dictated by the strut width. Fibre C has struts 8 thinned to approximately so as to push the lowest strong strut resonance to near 600 nm. This thickness is sufficient to allow the fibre to confine the light with low leakage loss at wavelengths up to 2500 nm.

Figure 9:
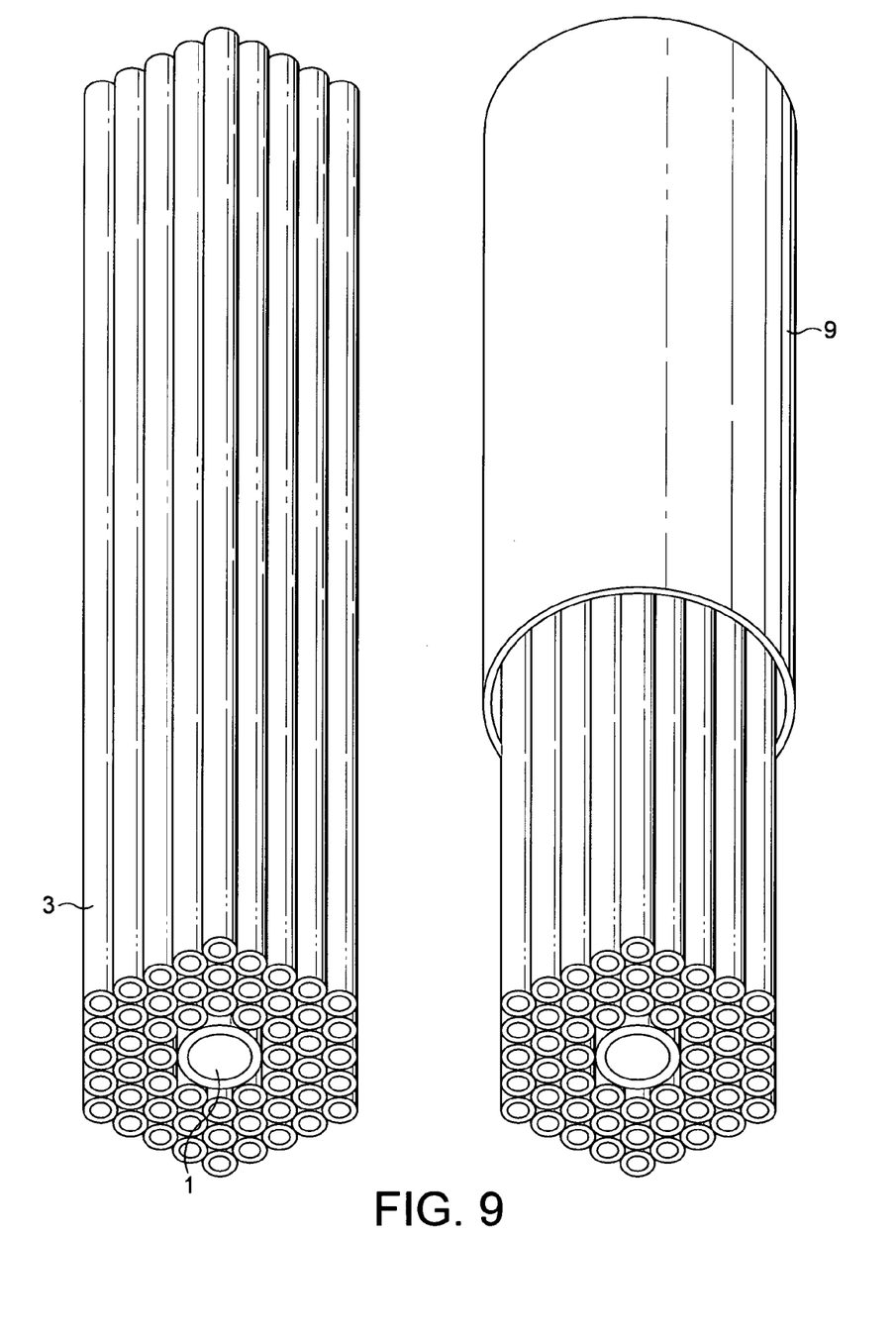
FIG. 9 shows the first part of an example HCPCF manufacturing process.
Figure 10:
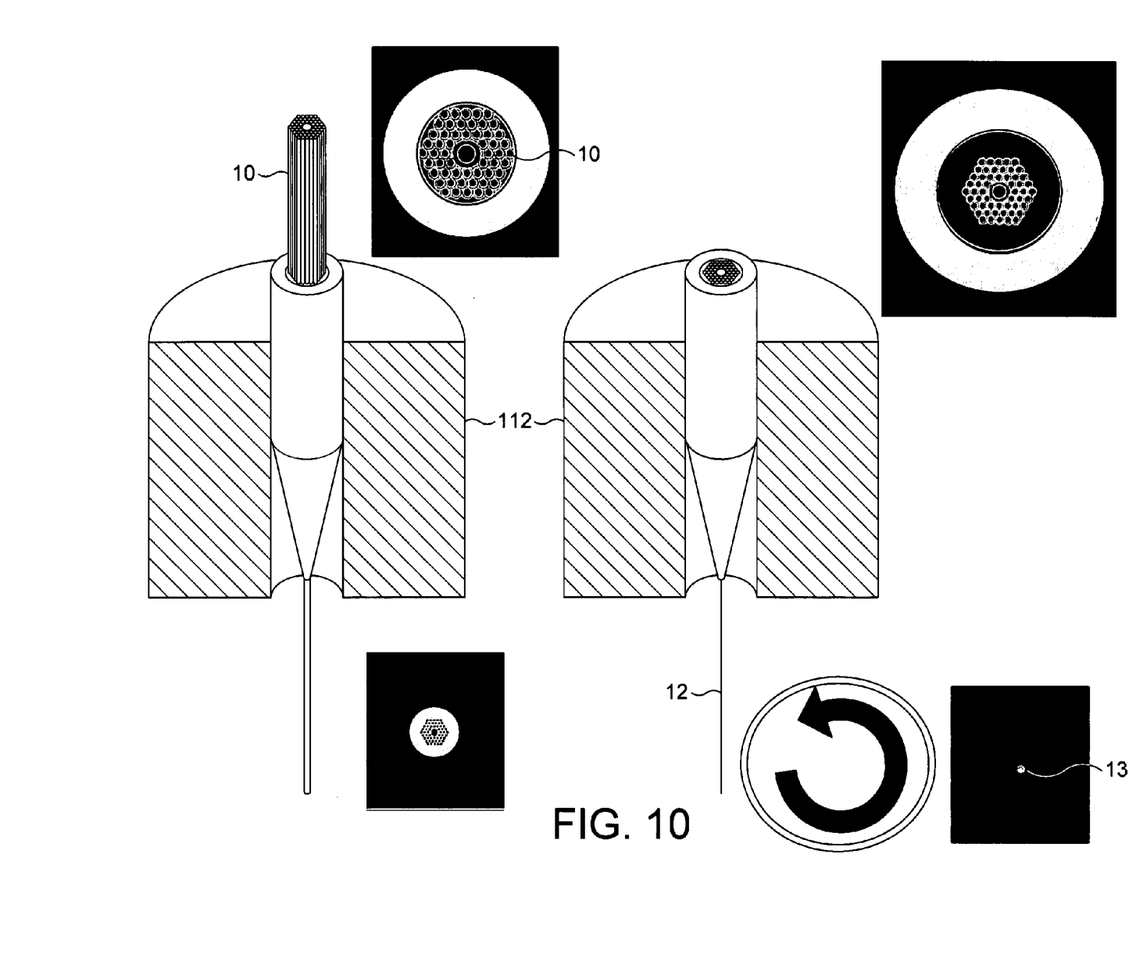
FIG. 10 shows the second part of an example HCPCF manufacturing process.

An example fibre is fabricated from thin, circular capillaries 3 with a stack-and-draw technique, as shown in FIGS. 9 and 10. The capillaries are usually made of silica, and may be, for example, one meter long and ~1 mm in diameter. The thickness of the capillaries may be <4% of their diameter. Unlike for conventional triangular lattice HCPCF, no glass rods are required to fill the interstitial holes 4. Capillaries 3 are stacked to give a preform 9. The core defect 1 is created by stacking shorter capillaries 3 on both sides of the stack leaving a gap in the middle. The preform is placed into a jacketing tube 10 for robustness and a standard pulling process is applied to give an intermediate perform 11, with the capillaries also being known as canes. The preform may be pulled, for example, at a rate ≧50 mm per minute and at a tension ≧400 g. During this process, controlled pressurisation of the cladding, and/or core and/or region separating the stack and the jacketing tube may be applied. The drawing temperature is kept below 1900° C. in order to keep the interstitial holes open. For a kagome lattice, the glass surface tension between the points of contact between the stacked capillaries form the Star of David pattern of the kagome structure.

Then an outer jacket tube (not shown) is positioned around the intermediate perform 11 for robustness and the ensemble is drawn into fibre 13, as shown in FIG. 9, using a standard drawing process in a furnace 12. The drawing step may be carried out, for example, with a cladding pressure ≦60 kPa and a cladding pressure ≦60 kPa. During the fibre drawing process, the integrity of the structure may be preserved by independently pressurizing the core, the cladding and the region separating the outer jacket tube from the cladding. The structure's air filling fraction may be increased above 90% by increasing the cladding and core pressure above 50 kPa. For example for a kagome structure, in order to maintain the triangular holes and the structure's high air filling fraction, the fibre is drawn at low temperature, high preform feed rate and high drawing tension. For example temperature <1950° C., feed rate >50 mm/min and drawing tension >400 g respectively may be used, although these figures depend on the drawing equipment used (for example, tower, cane and jacket sizes) as is understood by the skilled person. The typical outer diameter of the fibre is 300 µm for a pitch larger than 10 µm. Such a large structure enables accurate control over the size of the fibre as it is being drawn.

A kagome, honeycomb or square HCPCF with a large pitch can be simply be manufactured by stacking and drawing capillaries as discussed above and a concentric ring can be manufactured by a known process similar process to the stacking and drawing process. For all these cases, manufacturing a HCPCF with independent pressurisation of the core and the cladding holes means wall thickness can be controlled during manufacture to give a desired wall thickness.

Prior to the fibre drawing, the canes may be etched with liquid hydrogen fluoride (HF) or any other liquid HF-based agent suitable for silica etching to reduce the thickness of the cladding walls and hence increase the air filling fraction. The etchant may be pumped into the cane with the concentration of the etching agent and/or etching duration controlled to reduce the thickness of the cladding wall. The cane is flushed with water after the etching process. Advantageously, such etching is found to provide the vanishingly thin walls and nodes 6 described above.

Such liquid etching may also be used when drawing capillaries to make structures other than a kagome structure, in order to achieve thin connecting walls. The etching may be performed prior to drawing an intermediate preform in an otherwise standard process known by a skilled person.

Pre- and post-processing the canes may reduce optical attenuation by reducing the amount of water and impurities inside the silica forming the cladding.

Adding more rings to the cladding structure may further reduce the loss incurred by decreasing the confinement loss of the guided mode.

The ellipticity of the 19 cell defect core shown in FIG. 3c is due to the initial ovality of the jacketing tube used during the fibre drawing process. Such elliptical core may be used for polarization maintaining experiments.

The HCPCF based on large pitch (>five times the wavelength of interest) cladding gives optical characteristics including broad optical transmission bands covering the visible and near infra-red parts of the spectrum with relatively low loss and low chromatic dispersion, no detectable surface modes and high confinement of light in the core. This means this type of fibre may be used for guiding in the visible and UV. It may be used for applications using atomic vapor in the visible region, such as Cs, Na, and I, or any applications requiring a large hollow core (such as >20 μm). Applications of such a fibre further include gas sensing, quantum optics and high harmonic generation.

Ultra-flat chromatic dispersion properties and a low light-in-silica fraction, such as shown by the single cell fibre, mean that these fibres may be used in non-linear optics in gaseous media over a large optical bandwidth, such as high harmonic generation or soliton delivery.

The single cell defect fibre may couple selectively into the fundamental mode with ultra-low dispersion and limited bend loss. The relatively large core-size of the fibre simplifies the gas filling process, as the gas flow is increased by the larger core air hole, and reduces the wall-induced decoherence in quantum optics applications.

A core more than about 5 times larger than the pitch, such as that of the 19 cell defect kagome fibre, increases the ease with which gas enters inside the core and may be used for gas sensing applications.

As well as giving desirable optical characteristics, the large pitch of HCPCF makes manufacturing easier than for conventional HCPCFs, as the canes are drawn at a larger scale.

Pitch and defect sizes are not limited to the three examples described herein. The capillaries may be any standard silica capillaries known to the skilled person to be suitable for PCF applications. Components required for operating the disclosed HCPCF may be any known standard components.

As discussed above, examples of possible suitable cladding structures of a fibre are a square lattice, kagome structure, a honeycomb lattice, a triangular lattice and a concentric ring structure. These may have, for example, pitches >10 μm and as discussed above, may have very thin connecting struts. Different types of lattice may show a different upper limit to the normalised frequencies at which guidance may occur. Similar guidance properties to those of the kagome fibre discussed above may be found with a fibre having a different cladding lattice structure but which has very thin connecting high index constituents of the cladding compared to the pitch, which is primarily determined by the hole size of the lower index constituent of the cladding (for example air). Relatively low loss guidance over a broad transmission band may occur provided that the structure enables cladding modes showing fast transverse oscillations (relative to that of the core modes) which inhibit the coupling with the core modes.

Examples of applications where an HCPCF according to the described examples may be used are multi-octave (for example three-octave) spectral comb generation (for example spanning wavelengths from 325 nm to 2300 nm), for example to generate attosecond pulses. The HCPC may be used in generation of ultra-broad comb-like spectra using transient stimulated Raman scattering, which may be achieved with pumping by only a single laser with, for example, a 12 ns pulse width, 1064 nm wavelength and with peak powers not exceeding 40 kW. This represents a reduction by six orders of magnitude in the required laser powers over known techniques and substantially simplifies the driving lasers for higher-order stimulated Raman scattering (HSRS), thus providing an alternative which avoids known high harmonic generation (HHG) limitations on conversion efficiency and spectral location, thus opening up many possibilities in the field of attoscience.

The invention claimed is:

1. A hollow core photonic crystal fibre (HCPCF) having a wavelength of operation, the HCPCF comprising:
    a core region having a first refractive index;
    a cladding region surrounding the core region and comprising a plurality of microcapillaries arranged in a transverse structure having a pitch, the pitch of the structure being at least five times larger than the wavelength of operation, the cladding region having a second refractive index higher than the first refractive index, wherein the structure comprises nodes having a thickness <10% of the pitch at its vertices and portions of microcapillary walls connecting the nodes having a thickness of <3% of the pitch in a transverse direction.

2. A HCPCF according to claim 1, wherein the structure has a pitch of at least 10 μm.

3. A HCPCF according to claim 1, wherein the nodes have a thickness in the range 200 nm-1 μm.

4. A HCPCF according to claim 1, wherein the connecting portions have a thickness of <1% of the pitch.

5. A HCPCF according to claim 1, wherein the core region is a defect resulting from at least a partial omission of a single microcapillary.

6. A HCPCF according to claim 1, wherein the core region is a defect resulting from at least a partial omission of seven microcapillaries.

7. A HCPCF according to claim 1, wherein the core region is a defect resulting from at least a partial omission of nineteen microcapillaries.

8. A HCPCF according to claim 1, wherein the HCPCF has a kagome structure.

9. A HCPCF according to claim 1, wherein the pitch of the structure is at least ten times larger than the wavelength of operation.

10. A system for generating higher-order stimulated Raman scattering (HSRS), the system comprising a HCPCF according to claim 1.

11. A method of generating higher-order stimulated Raman scattering (HSRS) comprising the step of exciting gas confined in a HCPCF according to claim 1.

12. A method according to claim 11, wherein the gas is hydrogen or deuterium.

* * * * *